United States Patent
Kraft

(10) Patent No.: US 10,823,870 B2
(45) Date of Patent: Nov. 3, 2020

(54) DETERMINING FREQUENCY OF TRANSMITTER SIGNAL SOURCE BASED ON RECEIVED SIGNAL

(71) Applicant: Kersten Kraft, Celle (DE)

(72) Inventor: Kersten Kraft, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 100 days.

(21) Appl. No.: 16/196,278

(22) Filed: Nov. 20, 2018

(65) Prior Publication Data

US 2019/0154867 A1 May 23, 2019

Related U.S. Application Data

(60) Provisional application No. 62/589,731, filed on Nov. 22, 2017.

(51) Int. Cl.
*G01V 3/28* (2006.01)
*G01V 3/30* (2006.01)

(52) U.S. Cl.
CPC . *G01V 3/28* (2013.01); *G01V 3/30* (2013.01)

(58) Field of Classification Search
CPC .................................. G01V 3/28; G01V 3/30
See application file for complete search history.

(56) References Cited

U.S. PATENT DOCUMENTS

| | | | |
|---|---|---|---|
| 4,453,136 A | 6/1984 | Kelland | |
| 8,514,098 B2 | 8/2013 | Montgomery et al. | |
| 8,866,633 B2 | 10/2014 | Montgomery et al. | |
| 2004/0090234 A1 | 5/2004 | Macune | |
| 2004/0149434 A1 | 8/2004 | Frey et al. | |
| 2012/0024600 A1 | 2/2012 | Bittar et al. | |
| 2014/0132271 A1* | 5/2014 | Liu | G01V 3/20 324/338 |
| 2019/0376383 A1 | 12/2019 | Wu et al. | |

FOREIGN PATENT DOCUMENTS

| WO | 8703695 A1 | 6/1987 |
|---|---|---|
| WO | 2019005018 A1 | 1/2019 |

OTHER PUBLICATIONS

International Search Report and Written Opinion of the International Searching Authority, or the Declaration; PCT/US2018/061336; dated Feb. 19, 2019; 14 pgs.

* cited by examiner

*Primary Examiner* — Jay Patidar
(74) *Attorney, Agent, or Firm* — Cantor Colburn LLP

(57) ABSTRACT

A method to measure a parameter of interest is provided. The method includes receiving a first signal via an antenna of a reception circuit. The method further includes generating a second signal by a signal generator of the reception circuit. The method further includes mixing the first signal and the second signal in a mixer of the reception circuit to generate a third signal. The method further includes measuring a parameter of the third signal using an instrument. The method further includes adjusting, by a processor, a frequency of the second signal to substantially match a frequency of the first signal based at least in part on the measured parameter of the third signal. The method further includes determining, by the processor, the parameter of interest using the adjusted frequency of the second signal.

20 Claims, 3 Drawing Sheets

DETERMINING FREQUENCY OF TRANSMITTER SIGNAL SOURCE BASED ON RECEIVED SIGNAL

RELATED APPLICATION

This patent application claims the benefit of U.S. Provisional Patent Application No. 62/589,731 filed on Nov. 22, 2017, entitled "Determining Frequency of Transmitter Signal Source Based on Received Signal," the disclosure of which is incorporated by reference herein in its entirety.

BACKGROUND

Embodiments described herein relate generally to techniques for determining a frequency of a transmission signal source or tuning a frequency to match a transmission signal source based on a received signal.

Downhole exploration and production efforts involve the deployment of a variety of sensors and tools. These sensors and tools may communicate with one another and/or with a processing system or systems to transmit and receive data. The sensors provide information about the downhole environment, for example, by providing measurements of temperature, density, and resistivity, among many other parameters. For example, measurement while drilling (MWD) measurements can be transmitted from downhole devices (e.g., in the borehole assembly (BHA)) to surface (e.g., a processing system) to enable reliable wellbore decisions to be made with less non-production time. These measurements include, for example, resistivity measurements directional surveys, natural gamma ray, drilling dynamics, temperature, and annular pressure.

SUMMARY

According to one or more embodiments of the present disclosure, a method to measure a parameter of interest is provided, the method comprising: receiving a first signal via an antenna of a reception circuit; generating a second signal by a signal generator of the reception circuit; mixing the first signal and the second signal in a mixer of the reception circuit to generate a third signal; measuring a parameter of the third signal using an instrument; adjusting, by a processor, a frequency of the second signal to substantially match a frequency of the first signal based at least in part on the measured parameter of the third signal; and determining, by the processor, the parameter of interest using the adjusted frequency of the second signal.

According to one or more embodiments of the present disclosure, a reception circuit to measure a parameter of interest is provided, the reception circuit comprising: an antenna to receive a first signal having a first frequency; a signal generator to generate a second signal having a second frequency; a multiplier to generate a third signal by mixing the first signal and the second signal; an instrument to measure a parameter of the third signal; and a processor to adjust the second signal generated by the signal generator based at least in part on the measured parameter of the third signal, wherein the adjusted second signal has a frequency substantially equal to the first frequency, the processor further determining the parameter of interest using the frequency of the adjusted second signal.

BRIEF DESCRIPTION OF THE DRAWINGS

Referring now to the drawings wherein like elements are numbered alike in the several figures.

DETAILED DESCRIPTION

Figure 1:
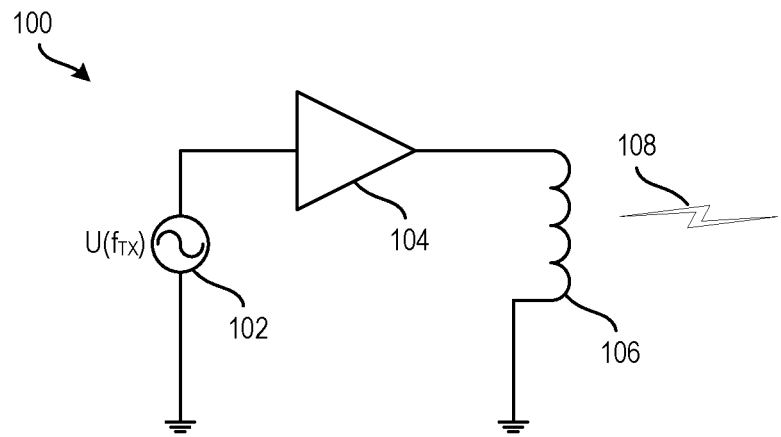
FIG. 1 depicts a circuit diagram of a transmission circuit for transmitting a transmission signal according to aspects of the present disclosure.

Transmitter and receiver of a downhole resistivity tool may be located in the BHA at a certain distance with no or limited communication. To allow proper processing of the signal received by the receiver through the earth formation, the frequency at which the transmitter is transmitting needs to be known by the receiver.

The present techniques relate to determining a frequency of a transmission signal source based on a received electromagnetic signal without sampling the signal. Some measurement while drilling (MWD) downhole tools (which are used to, among other things, measure the resistivity of a surrounding Earth formation) are equipped with transmitters to send signals into the Earth formation and receivers to receive these signals from the Earth formation. In examples, the transmitter(s) and the receiver(s) contain an antenna and electronic components to generate and send the signal to be transmitted (in the case of the transmitter) or to receive and process the received signals (in the case of the receiver). The receiver as well as the transmitter may include high temperature electronics such as ceramic based electronic circuits including ceramic substrate, high temperature bondings or high temperature isolation and molding materials.

Resistivity measurements of an Earth formation used in a drilling and/or geo steering and/or logging application can be based on electromagnetic wave measurements. For a large depth of detection (deep reading), low measurement frequencies (e.g., 10 kHz to 200 kHz) and large distances between the transmitter and the receiver are needed. If the depth of detection is large and the measurement tool (resistivity tool) is close enough to the drill bit, measurements at the bit or even ahead of the bit (look ahead) become possible. However, the distance between transmitter and receiver may be too large to incorporate the transmitter and receiver into one downhole module (tool or sub). For other applications, it may be desirable to operate the transmitter and receiver independently from each other (e.g., in separate modules/tools/subs). The transmitter and the receiver, when separated in separate downhole tools in the BHA, suffer from either no communication or insufficient communication among each other. The information about the exact frequency at which the transmitter is transmitting may not be communicated to the receiver. Also, the transmitter may not know itself at which frequency it is actually transmitting, because a variation of the signal generation in the transmitter due to changing environmental conditions (e.g., temperature) may not be predictable. Not knowing the frequency at which the transmitter is transmitting leads to uncertainties in processing of the received signal at the receiver causing uncertainties in the determined phase or attenuation (parameter of interest) and subsequently in the calculated resistivity of the earth formation.

There are various reasons for insufficient communication between transmitter and receiver. In some cases, downhole tools (subs) in a BHA are electrically connected by an electrical line. This line is providing energy (power) from a downhole generator, such as a turbine and an alternator and/or communication from a master in the BHA to the various downhole tools. Additionally, communication to the master from the various downhole tools, and communication among the various downhole tools are performed using the line. The master in the BHA may communicate data to a telemetry device, which transmits and receives data to and from the surface. The electrical line in the BHA has bandwidth and communication speed restrictions.

Communication usually underlies a predetermined scheme (protocol) to manage communication between the numerous nodes along the electrical line. Also, there might be other tools between the transmitter and receiver sub, such as other measurement tools (formation evaluation (FE) tools), a master tool, a mud-pulser tool, a drilling tool, such as a downhole motor or turbine, or a reamer, or a BHA dynamic measuring tool, or other tools, such as a stabilizer, a flex sub, a spacer sub, a filter, a valve or a thruster. Due to the length of the line between transmitter and receiver there may be communication delays; therefore, communicating the transmission signal parameters may not be properly synchronized (time relative to time transmitter is transmitting the signal and time receiver is receiving the transmitted signal). In a BHA the different downhole tools or subs are connected to each other by a threaded tool connection, which comprises a pin connection on the downhole end of the upper sub and a box connection at the uphole connection of the lower sub (downhole means oriented toward the bottom end of the borehole, uphole means oriented toward the surface end of the borehole). The threaded connection may comprise an electrical connector to connect the two downhole tools electrically. By way of non-limiting example, the connector may be a conductive ring in a downhole shoulder of the upper sub and an uphole shoulder of the lower sub. Other connector types are known and described in the prior art. With or without other downhole tools placed between the transmitter and the receiver, the receiver (receiver sub) may be separated by the transmitter (transmitter sub) by a distance of 0 m to 1 m, 1 m to 3 m, or 3 m to 5 m, or 5 m to 10 m, or 10 m to 20 m, or 20 m to 30 m, 30 m to 50 m, etc.

The receiver and the transmitter may not be connected by an electrical line and, therefore, may have no means to communicate through a cable connection. In case of no electrical line or insufficient communication between receiver and transmitter, the information about the frequency at which the transmitter is transmitting is not transmitted via a cable connection between transmitter and receiver, but instead the information about the frequency is transmitted wirelessly through the Earth formation. In this case, the signal the receiver is receiving from the transmitter is only the transmitted electromagnetic signal which propagates through the Earth formation to the receiver. The transmitted electromagnetic signal does not carry any additional information or data (no modulated information). The transmitter transmits an electromagnetic signal at a single frequency or at multiple frequencies. Therefore, the information the receiver receives about the frequency at which the transmitter is transmitting is the received frequency. In order to know the frequency of the received signal the receiver needs to determine the frequency inside the receiver. The receiver may determine the frequency of the received signal by tuning a frequency which is created in the receiver to match the received frequency.

In such cases, a downhole module containing the receiver needs to know the frequency of the transmitted electromagnetic signal transmitted by the transmitter that is in another downhole module. Usually, the frequency of a transmitted signal cannot be assumed as constant because environmental factors can alter the frequency of the transmitted signal. For example, temperature can affect a clock oscillator that is used to transmit the signal. Also other electronic components may be sensitive to temperature changes, such as capacitors, transistors, operational amplifiers, processors, resistors, diodes, integrated circuits, ceramic based electronics components (e.g., Multi Chip Modules (MCM)), etc. If the frequency of the transmission signal is known, signal processing in the receiver module can be adjusted to account for changes to the transmitter signal and therefore can improve the accuracy of the processing results (parameter of interest) such as phase and attenuation (or amplitude) of the received signal compared with the transmitted signal, which further leads to a better accuracy of the resistivity of the earth formation, which is determined from phase and/or attenuation (parameter of interest) of the received signal. The parameter of interest the phase and/or attenuation of the received signal, which can be determined more accurate by knowing the precise frequency of the received signal.

Usually, downhole modules to determine the formation resistivity with a large depth of detection are separated in different subs to increase the distance between the transmitter antenna and the receiver antennas. If the antennas and their respective electronic components to generate and send the transmitted signal or to receive and process the received signal are distributed to different downhole modules, there is usually no interface available to share instantaneously information about the signal parameter. For an absolute measurement of a signal attenuation or signal phase caused by the formation properties of a formation surrounding the drill string, it is useful to know the signal parameter of the signal transmitted by a transmitter as much and as good as possible.

Accordingly, the present techniques provide for determining the frequency and/or phase of a transmitter signal source based on the received signal. Although the present techniques are described using an example of drilling technologies, the present techniques can also apply to other technologies where signals are transmitted wirelessly from a transmitter to a receiver and where it is important to determine the frequency of the transmission signal source based on a received signal. In particular, the present techniques provide a measurement technique to determine the signal level (amplitude or attenuation) and the phase or a phase shift or delay (e.g., to a reference) of single tone or multi tone signals when the exact frequency or frequencies is unknown. For example, the present techniques provide for determining the frequency of a received signal (transmitted by a transmitter) by multiplying or mixing the received signal with a reference signal (e.g., based on a known frequency or a frequency with a constant relation to a crystal oscillator). The method can be described as tuning the frequency of a references signal generated in the receiver to the frequency of the received signal.

According to aspects of the present disclosure, it can be assumed that a signal level (amplitude) of the transmitted signal is constant and known on the receiver antenna and its connected processing components (processor). This might be achieved by an appropriate controller or control algorithm in the transmitter to keep the signal level constant and by a corresponding calibration procedure to determine the signal level of the transmitted signal.

The frequency of the transmitted signal may be affected by the environmental temperature (e.g., temperature of the Earth formation) and cannot be assumed as constant or known even though it is referenced to a crystal oscillator with a high accuracy and stability. The frequency of the transmitted signal is determined by controlling the measurement processing, and some internal correction purposes. This can be useful, for example, when the signal is used for measurement purposes.

Known techniques (e.g., determination of the periodic time or similar) to determine a frequency of the transmitted signal are not accurate enough. This is especially true when the signal has a low signal level and a low signal to noise ratio because the detection of the zero-crossing, the maximum, and/or other significant signal points is not sufficiently accurate because of noise or jitter.

Turning now to aspects of the present disclosure, FIG. 1 depicts a circuit diagram of a transmission circuit 100 in a transmitter for transmitting a transmission signal according to aspects of the present disclosure. A signal source 102 generates a waveform (e.g., a sine wave shaped signal) with a given frequency $f_{TX}$. The signal source is a signal generator or tone generator or function generator (e.g., crystal oscillator, Pierce oscillator, LC circuit). Other waveforms than a sine wave may be used, such as sawtooth, square or triangle. A signal generator may comprise a clock or clock generator (clock of transmitter signal generator) providing a clock signal as a time basis used to generate an alternating signal such as the transmission signal. The waveform is amplified by a power amplifier 104 and is transmitted via a transmission antenna 106. The waveform can be transmitted as a signal (i.e., a "transmission signal 108"), for example, through an Earth formation surrounding or in proximity to the transmission circuit 100 using the frequency $f_{TX}$. The signal can then be received, for example, by a reception circuit such as the reception circuit 200 of FIG. 2. In non-limiting example the signal may comprise more than one frequency $f_{TXn}$.

Figure 2:
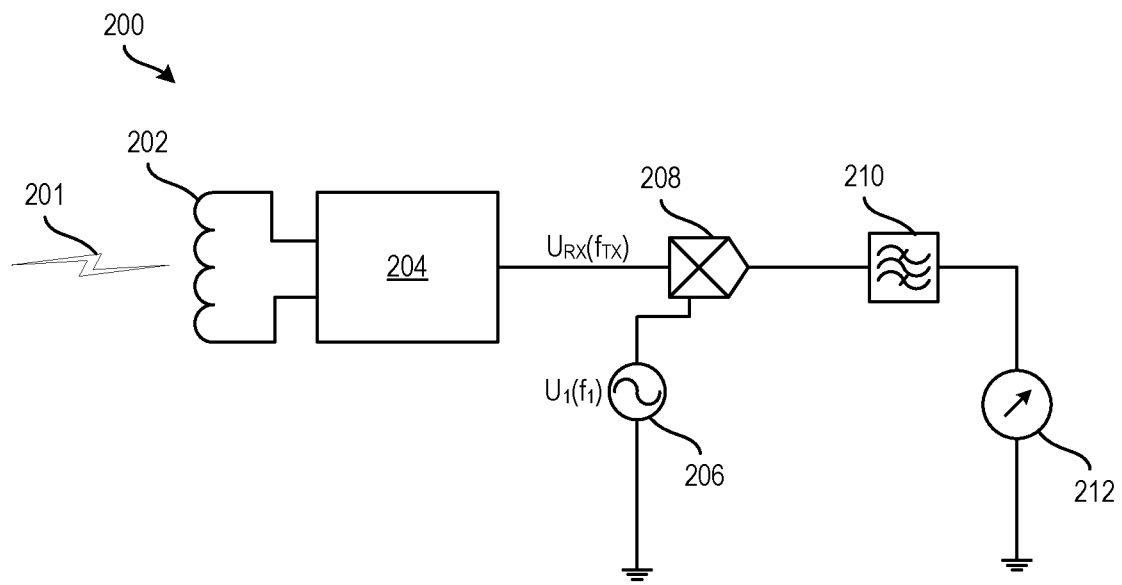
FIG. 2 depicts a circuit diagram of a reception circuit for determining a frequency of the transmission circuit of FIG. 1 based on a received signal according to aspects of the present disclosure.

In particular, FIG. 2 depicts a circuit diagram of a reception circuit 200 in a receiver for determining a frequency of the transmission circuit 100 of FIG. 1 based on a received signal according to aspects of the present disclosure. The reception circuit 200 receives, via the reception antenna 202, a signal (i.e., a "reception signal 201") generated and transmitted by a transmission circuit (e.g., the transmission circuit 100 of FIG. 1). The reception signal 201 received by the reception circuit 200 can be different from the transmission signal 108 transmitted by the transmission circuit 100 as a result of the signal passing through an earth formation between the transmission circuit 100 and the reception circuit 200. The earth formation properties such as resistivity, conductivity, permittivity or electric susceptibility are affecting the electromagnetic signal transmitted by the transmitter propagating through the earth formation to the receiver. The formation properties change with geology (lithology), temperature, pressure, fluid content, fluid type (hydrocarbon, water) and fluid state (liquid (low or high viscosity (tar)), gaseous). The porosity, pore size and salinity of the formation are also affecting the propagating electromagnetic wave in the earth formation. The effect of the formation properties on the propagation electromagnetic signal is a change in phase and/or amplitude (attenuation) of the propagating electromagnetic signal. Measuring the amplitude (attenuation) or phase (phase shift), the parameters of interest, of a signal received at a receiver of a resistivity tool is commonly referred to a resistivity or conductivity measurement of the surrounding earth formation.

An analog signal preprocessing unit 204 amplifies the reception signal and filters the reception signal (e.g., to eliminate noise, etc.). The amplified and filtered signal $U_{RX}$ is a function of the frequency $f_{TX}$ of the transmission signal and is expressed as $U_{RX}(f_{TX})$. The signal $U_{RX}(f_{TX})$ is fed into a multiplier (or frequency mixer) 208 as a first signal along with a monotone signal $U_1(f_1)$ generated by an electrical signal generator 206 as a second signal. The monotone signal $U_1(f_1)$ has a frequency $f_1$. The signals $U_{RX}(f_{TX})$ and $U_1(f_1)$ are multiplied (mixed) together by the multiplier 208, and a result of the multiplication is filtered at a filter 210 to remove signal components with a frequency f>0. A signal level of the filtered signal is measured with an instrument 212 suitable for measuring signal levels, such as for example a voltmeter (e.g., an oscilloscope, or ammeter, voltage monitor or current monitor, DC voltmeter or DC ammeter, or digital multimeter (DMM)). The instrument may measure a voltage or may measure a current using a resistor. The instrument provides the measurement value to the processor (e.g., the processing system 400 of FIG. 4, microprocessor, or other specialized hardware processing circuit). The instrument may provide to the processor a value representative of a parameter of the resulting signal, which can be the voltage, the current, a frequency or any other parameter which is related to the signal property of the filtered signal. The multiplier (or frequency mixer) 208 is a nonlinear electrical circuit (e.g., diode, transistors, passive or active mixers) that creates new frequencies from two signals applied to it. In some applications, two signals are applied to a mixer (i.e., the multiplier 208). The mixer produces new signals at the sum and difference of the original frequencies. Other frequency components may also be produced in a practical frequency mixer.

Figure 4:
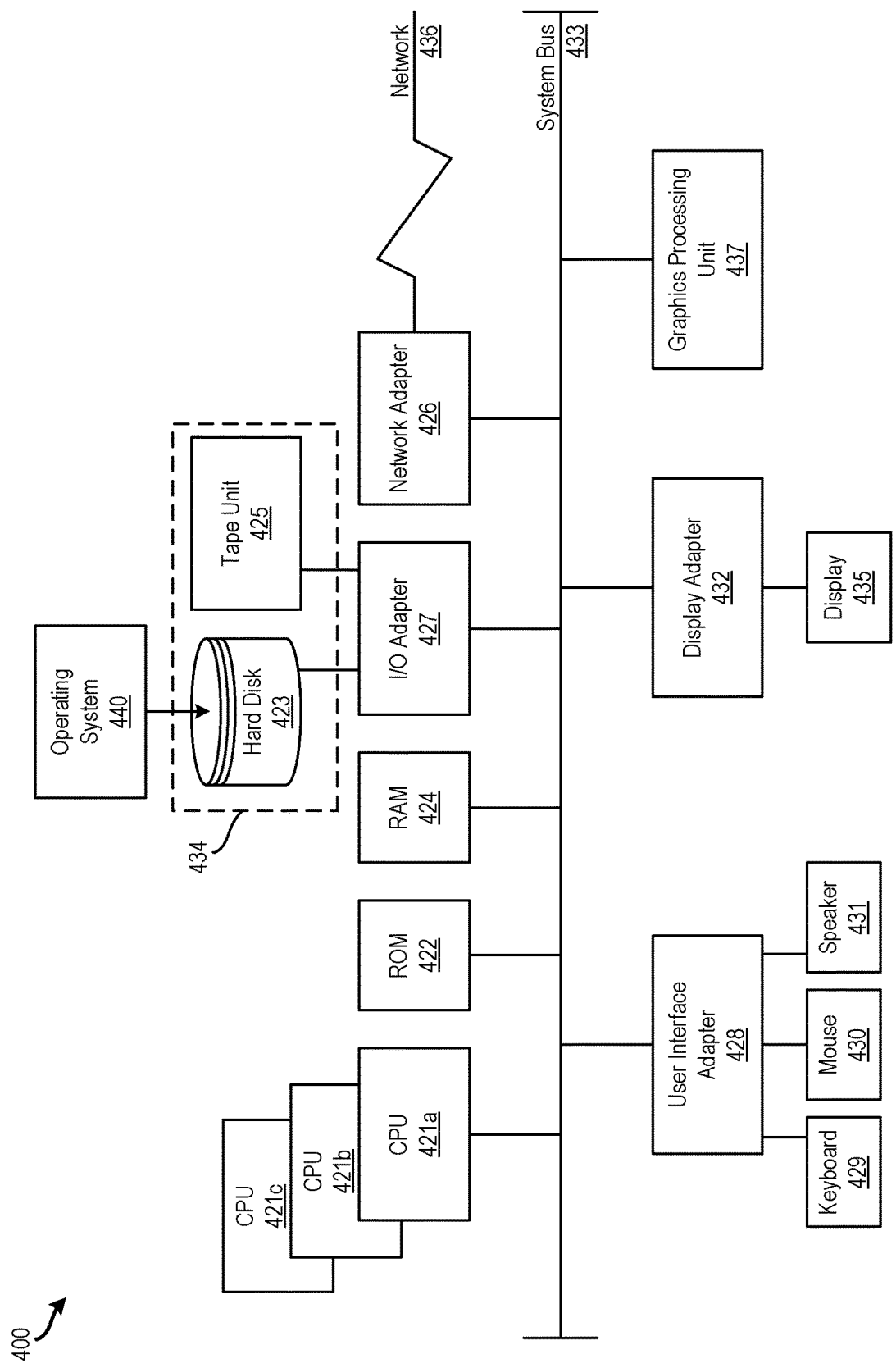
FIG. 4 depicts a block diagram of a processing system that can be used for implementing the techniques described herein according to aspects of the present disclosure.

According to aspects of the present disclosure, the frequency $f_1$ of the electrical signal generator 206 (e.g., crystal oscillator, Pierce oscillator, LC circuit) is variable and controllable by a suitable processing unit, such as a controller or a processor (e.g., the processing system 400 of FIG. 4). The processing unit observes the measured signal level using the instrument 212. The frequency $f_1$ can then be adjusted until the measured signal level measured at the instrument 212 has reached a maximum. The frequency $f_1$ of the signal generator may be controlled by using a voltage controlled oscillator. The voltage to control the oscillator may be provided by the processor. The electrical signal generator 206 may include a clock or clock generator (clock of reference signal generator) providing a clock signal as a time basis used to generate an alternating signal such as the reference signal having the frequency $f_1$.

Based on the multiplication in the multiplier 208 (also referred to as mixing in a mixer) of two waveform signals (e.g., sine wave shaped signals) $U_{RX}(f_{TX})$ and $U_1(f_1)$, a signal component with a frequency f=0 (i.e., a direct current (DC) component) exists when both input signals $U_{RX}(f_{TX})$ and $U_1(f_1)$ have the same frequency. This is evident from the following equation:

$$A_a \sin(2\pi f_a t) * A_b \sin(2\pi f_b t) = \tfrac{1}{2} A_a A_b \{\cos(2\pi f_a - 2\pi f_b)t - \cos(2\pi f_a + 2\pi f_b)t\},$$

where $A_a$ is the amplitude of a first signal (e.g., the signal $U_{RX}(f_{TX})$ fed into the multiplier 208), $A_b$ is the amplitude of a second signal (e.g., the signal $U_1(f_1)$ fed into the multiplier 208), $f_a$ is the frequency of the first signal, and $f_b$ is the frequency of the second signal. When $f_a=f_b=f$, the previous formula can be simplified and expressed as follows:

$$A_a \sin(2\pi ft) * A_b \sin(2\pi ft) = \tfrac{1}{2}A_a A_b \{\cos(0)-\cos(4\pi ft)\}.$$

The term $\cos(4\pi f\,t)$ is filtered out by the filter 210 (low pass), and the term $\cos(0)$ is equal to 1. Therefore the result of the multiplication of the first signal and the second signal by the multiplier 208 is equal to $\tfrac{1}{2}A_a A_b$ ($U\sim\tfrac{1}{2}A_a A_b$).

To determine the unknown frequency $f_{TX}$ of the transmission signal 108, the frequency $f_1$ of the signal generated by the electrical signal generator 206 is adjusted until a DC component or near DC component (frequency is substantially zero) is detected by the instrument 212. That is, the frequency $f_1$ of the signal generated by the electrical signal generator 206 (reference signal) is tuned until $f_{TX}=f_1$ or $f_{TX}\approx f_1$. Once the condition $f_{TX}=f_1$ is met, the frequency of the transmission signal 108 is known at the reception circuit 200, and the frequency of the reference signal $f_1$ equals the frequency of transmission signal $f_{TX}$. This frequency can then be used for further processing the received signal, e.g., for determining the phase (or phase shift) and/or the attenuation (or amplitude) of the received signal and, based on phase and attenuation, the resistivity of the Earth formation can be calculated. The basic concept described herein is to tune a reference frequency generated by a signal generator in the receiver to a transmitter frequency generated by a signal generator in the transmitter. The clock in the electrical signal generator 206 of the receiver and the clock in the signal generator in the transmitter are not synchronized; they have a mismatch or are desynchronized, respectively. The electrical signal generator 206 in the receiver and the signal generator (i.e., the signal source 102) in the transmitter are independent of each other and are located in separate electronic circuits. The separate electronic circuits are not communicating any data or information which would allow the synchronization of the clock in the signal generator in the receiver and the clock in the signal generator in the transmitter or synchronizing the signal generator in the receiver or the signal generator in the transmitter at all. By tuning the reference frequency $f_1$ to be equal to the frequency of the transmitted and received signal $f_{TX}$, the clocks of the electrical signal generator 206 of the receiver and the signal generator 102 of the transmitter are getting synchronized. The synchronized clock of the receiver may be further used for processing purposes or for synchronizing other processes in the receiver.

If the condition $f_{TX}=f_1$ is not met exactly, then the resulting signal of the multiplication (mixing) in multiplier 208 may not have a frequency of zero ($f_a-f_b \neq 0 = f_{int}$). The resulting signal will have after the filtering a lower frequency than $f_{TX}$ and $f_1$ and will be easy to sample in order to determine the frequency $f_{int}$ of the resulting signal (resulting signal or intermediate signal with intermediate frequency $f_{int}$ after filtering by filter 210), $U_{(f_{int})}=\tfrac{1}{2}A_a A_b(\cos(2\pi f_{int}t))$. Frequency $f_1$ (reference frequency) and the frequency $f_{int}$ of the resulting signal can then be used to determine the frequency $f_{TX}$.

To reduce the effort for searching for the DC component, a priori knowledge about the range of the transmission signal 108 can be used by the controller (e.g., the processing system 400 of FIG. 4, a microprocessor, or other specialized hardware processing circuit, such as a field programmable gate array (FPGA), an application-specific integrated circuit (ASIC), etc.) to limit the frequency range of the electrical signal generator 206. For example, if it is known that the transmission circuit 100 operates at a certain frequency (e.g., about 920 MHz), a range (e.g., about 915 MHZ to about 925 MHz) around the known frequency can be used by the electrical signal generator 206 to more efficiently determine the frequency of the transmission signal 108. Typical transmitter frequencies for resistivity tools are, 10 kHz to 200 kHz, 300 kHz to 500 kHz, 300 kHz to 3 MHz or 1 MHz to 3 MHz, etc.

According to aspects of the present disclosure, the accuracy of the frequency determination of the transmission signal 108 is based on the accuracy and the frequency resolution of the electrical signal generator 206. The quality of the separation of the DC component by the filter 210 also affects the accuracy of the identified frequency $f_{TX}$.

According to aspects of the present disclosure, the present techniques can be applied to determine the frequency of the transmitted signal, to determine the periodic time, and to detect the zero-crossing of the signal. To measure a period time, any part of the signal can be used to start and stop a timer. For sine wave shaped signals, usually, the zero-crossing is used because this type of signal has a steep rise at the zero-crossing. If the signal has a low signal level and a low signal to noise ratio, the detection of the zero-crossing can be inaccurate. Jitter and resolution of the reference timer used to measure the periodic time can reduce the accuracy of the measurement further. However, the resolution causing inaccuracy can be reduced by using a clock oscillator, which drives the timer, with a higher frequency. However, the higher frequency can increase requirements on the hardware.

In some aspects of the present disclosure, a phase shift of the signals exists. If a phase shift is added to the signals, the following equation can be used to perform the multiplication in the multiplier 208:

$$U_{TX}\sin(2\pi f_{TX}t+\theta_{TX})*U_1\sin(2\pi f_1 t+\theta_1)=\tfrac{1}{2}U_{TX}U_1\{\cos((2\pi f_{TX}t+\theta_{TX})-(2\pi f_1 t+\theta_1))-\cos((2\pi f_{TX}t+\theta_{TX})+(2\pi f_1 t+\theta_1))\},$$

where $U_{TX}$ is the amplitude of the transmitted signal, $U_1$ is the amplitude of the signal generated by the electrical signal generator 206, $\theta_{TX}$ is the phase shift of the transmitted signal, and $\theta_1$ is the phase shift of the signal generated by the electrical signal generator 206. When $f_{TX}=f_1=f$, the previous formula can be simplified and expressed as follows:

$$U_{TX}\sin(2\pi f_{TX}t+\theta_{TX})*U_1\sin(2\pi f_1 t+\theta_1)=\tfrac{1}{2}U_{TX}U_1\{\cos((\theta_{TX})-(\theta_1))-\cos(4\pi ft+\theta_{TX}+\theta_1)\}.$$

If the signal component $\cos(4\pi ft+\theta_{TX}+\theta_1)$ is removed by the filter 210, the signal level of the remaining DC component is dependent from the phase difference of both multiplied signals. This problem is solved by using an adjustable phase generated by the electrical signal generator 206 (e.g., by using an inductor, capacitor, or non-linear resistors). With this modification of the phase of the generated signal, $U_1(f_1)$ can be adjusted to be equal to the signal $U_{RX}(f_{TX})$. This adjustment occurs after the adjustment of the frequencies to set $f_{TX}=f_1$. If this is done, the phase adjustment could be done in a second iteration, while the maximum signal level measured on the instrument 212 indicates that the condition $\theta_{TX}=\theta_1$ is met. The electrical signal generator 206 is a different signal generator than the signal generator (signal source) 102. The signal generator 102 is located in the transmitter generating the transmitted signal with frequency $f_{TX}$. The electrical signal generator 206 is located in the receiver generating the reference signal with frequency $f_1$.

Figure 3:
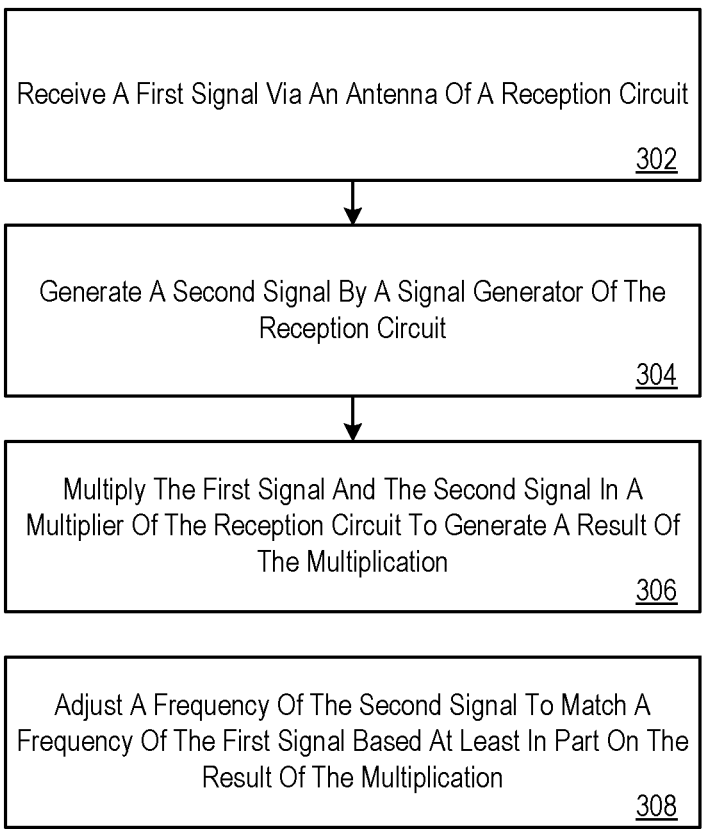
FIG. 3 depicts a flow diagram of a method for determining a frequency of a transmission signal source based on a received signal according to aspects of the present disclosure.

FIG. 3 depicts a flow diagram of a method 300 for determining a frequency of a transmission signal source based on a received signal according to aspects of the present disclosure. The method 300 can be implemented by any suitable processing system, such as the processing system 400 of FIG. 4, described below. The method can also be implemented using circuitry such as the transmission circuit 100 of FIG. 1 in conjunction with the reception circuit 200 of FIG. 2, for example. The processing system or alternatively a processor or controller may be located at the surface or downhole in the earth formation inside the BHA. The transmitter and receiver may each have a processing system, a processor or a controller. As the transmitter and receiver may be located in different downhole modules, the processing unit, processor or controller of the transmitter and receiver may also be located in different downhole modules.

At block 302, receiving a first signal (e.g., the reception signal 201) via an antenna (e.g., the reception antenna 202) of a reception circuit (e.g., the reception circuit 200). At block 304, generating a second signal by a signal generator (e.g., the electrical signal generator 206) of the reception circuit. At block 306, multiplying the first signal and the second signal in a multiplier (e.g., the multiplier 208) of the reception circuit to generate a result of the multiplication. At block 308, adjusting, by a processing device (e.g., controller, processor or the processing system 400 of FIG. 4), a frequency of the second signal to match a frequency of the first signal based at least in part on the result of the multiplication. The adjusted frequency is the frequency of the transmission signal source.

Additional processes also can be included. For example, the method 300 can include amplifying and/or filtering the first signal prior to the multiplying using an analog signal preprocessing unit (e.g., the analog or digital signal preprocessing unit 204). The method 300 can also include filtering the result of the multiplying to remove noise, such as using a filter (e.g., the filter 210). Further, the method 300 can include measuring the result with an instrument (i.e., the instrument 212). The processing device or a processor can receive a measured signal level from the instrument and can perform the adjustment of the frequency of the second signal using the measured signal level from the instrument. The method 300 can also include performing a resistivity measurement of an Earth formation using the adjusted frequency of the second signal. It should be understood that the processes depicted in FIG. 3 represent illustrations, and that other processes can be added or existing processes can be removed, modified, or rearranged without departing from the scope and spirit of the present disclosure. The processing unit may calculate from the known frequency, phase (phase shift) or amplitude (attenuation) the resistivity of the earth formation. The calculated resistivity may be transmitted either to a memory located in the downhole tool or may be transmitted via a telemetry system to the surface (real time data), where it is received and further processes and stored. The telemetry system may be a mud pulse telemetry system, a wired pipe system, an electromagnetic telemetry system or an acoustic telemetry system.

It is understood that embodiments of the present disclosure are capable of being implemented in conjunction with any other suitable type of computing environment now known or later developed. For example, FIG. 4 illustrates a block diagram of a processing system 400 for implementing the techniques described herein. In examples, processing system 400 has one or more central processing units (processors) 421a, 421b, 421c, etc. (collectively or generically referred to as processor(s) 421 and/or as processing device(s)). In aspects of the present disclosure, each processor 421 may include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of processing system 400.

Further illustrated are an input/output (I/O) adapter 427 and a communications adapter 426 coupled to system bus 433. I/O adapter 427 may be a small computer system interface (SCSI) adapter that communicates with a hard disk 423 and/or a tape storage drive 425 or any other similar component. I/O adapter 427, hard disk 423, and tape storage device 425 are collectively referred to herein as mass storage 434. Operating system 440 for execution on processing system 400 may be stored in mass storage 434. A network adapter 426 interconnects system bus 433 with an outside network 436 enabling processing system 400 to communicate with other such systems.

A display (e.g., a display monitor) 435 is connected to system bus 433 by display adaptor 432, which may include a graphics adapter to improve the performance of graphics intensive applications and a video controller. In one aspect of the present disclosure, adapters 426, 427, and/or 432 may be connected to one or more I/O busses that are connected to system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. A keyboard 429, mouse 430, and speaker 431 may be interconnected to system bus 433 via user interface adapter 428, which may include, for example, a Super I/O chip integrating multiple device adapters into a single integrated circuit.

In some aspects of the present disclosure, processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 421, storage capability including system memory (e.g., RAM 24), and mass storage 434, input means such as keyboard 429 and mouse 430, and output capability including speaker 431 and display 435. In some aspects of the present disclosure, a portion of system memory (e.g., RAM 424) and mass storage 434 collectively store an operating system to coordinate the functions of the various components shown in processing system 400.

Embodiment 1

A method to measure a parameter of interest comprising: receiving a first signal via an antenna of a reception circuit; generating a second signal by a signal generator of the reception circuit; mixing the first signal and the second signal in a mixer of the reception circuit to generate a third signal; measuring a parameter of the third signal using an instrument; adjusting, by a processor, a frequency of the second signal to substantially match a frequency of the first signal based at least in part on the measured parameter of the third signal; and determining, by the processor, the parameter of interest using the adjusted frequency of the second signal.

Embodiment 2

According to at least one of the previous embodiments, the method further comprising conveying a bottom hole assembly into the earth formation, the bottom hole assembly comprises a resistivity tool and the first signal is an electromagnetic signal.

Embodiment 3

According to at least one of the previous embodiments, the method wherein the measured parameter is an amplitude of the third signal.

Embodiment 4

According to at least one of the previous embodiments, the method wherein adjusting comprises identifying a maximum of the amplitude.

Embodiment 5

According to at least one of the previous embodiments, the method further comprising conveying a bottom hole assembly into an earth formation, wherein the reception circuit is disposed in the bottom hole assembly.

Embodiment 6

According to at least one of the previous embodiments, the method wherein the bottom hole assembly comprises a first sub and a second sub, the first sub comprises a transmission circuit, and the second sub comprises the reception circuit.

Embodiment 7

According to at least one of the previous embodiments, the method wherein a third sub is located between the first sub and the second sub.

Embodiment 8

According to at least one of the previous embodiments, the method wherein adjusting comprises synchronizing a clock.

Embodiment 9

According to at least one of the previous embodiments, the method further comprising filtering the third signal.

Embodiment 10

According to at least one of the previous embodiments, the method wherein the instrument is a voltmeter.

Embodiment 11

According to at least one of the previous embodiments, the method wherein the processor receives a value representative of the measured amplitude of the third signal from the instrument.

Embodiment 12

According to at least one of the previous embodiments, the method further comprising adjusting, by using the processor, a phase of the second signal based at least in part on the measured parameter of the third signal.

Embodiment 13

A method to measure a parameter of interest comprising: receiving a first signal via an antenna of a reception circuit; generating a second signal by a signal generator of the reception circuit; mixing the first signal and the second signal in a mixer of the reception circuit to generate a third signal; measuring a parameter of the third signal using an instrument; adjusting, by a processor, a frequency of the second signal to substantially match a frequency of the first signal based at least in part on the measured parameter of the third signal; and determining, by the processor, the parameter of interest using the adjusted frequency of the second signal.

Embodiment 14

According to at least one of the previous embodiments, the reception circuit further comprising a bottom hole assembly conveyed into an earth formation, wherein the reception circuit is disposed in the bottom hole assembly.

Embodiment 15

According to at least one of the previous embodiments, the reception circuit wherein the bottom hole assembly comprises a resistivity tool and the first signal is an electromagnetic signal.

Embodiment 16

According to at least one of the previous embodiments, the reception circuit wherein the measured parameter is an amplitude of the third signal.

Embodiment 17

According to at least one of the previous embodiments, the reception circuit wherein adjusting comprises identifying a maximum of the amplitude of the third signal.

Embodiment 18

According to at least one of the previous embodiments, the reception circuit further comprising a filter to filter the third signal.

Embodiment 19

According to at least one of the previous embodiments, the reception circuit wherein the processor receives a value representative to the measured amplitude of the third signal from the instrument.

Embodiment 20

According to at least one of the previous embodiments, the reception circuit wherein the processor adjusts a phase of the second signal based at least in part on the measured parameter of the third signal.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method to measure a parameter of interest comprising:
   receiving a first signal via an antenna of a reception circuit;
   generating a second signal by a signal generator of the reception circuit;
   mixing the first signal and the second signal in a mixer of the reception circuit to generate a third signal;
   measuring a parameter of the third signal using an instrument;
   adjusting, by a processor, a frequency of the second signal to substantially match a frequency of the first signal based at least in part on the measured parameter of the third signal; and
   determining, by the processor, the parameter of interest using the adjusted frequency of the second signal.

2. The method of claim 1, further comprising conveying a bottom hole assembly into the earth formation, the bottom hole assembly comprises a resistivity tool and the first signal is an electromagnetic signal.

3. The method of claim 1, wherein the measured parameter is an amplitude of the third signal.

4. The method of claim 3, wherein adjusting comprises identifying a maximum of the amplitude.

5. The method of claim 1, further comprising conveying a bottom hole assembly into an earth formation, wherein the reception circuit is disposed in the bottom hole assembly.

6. The method of claim 5, wherein the bottom hole assembly comprises a first sub and a second sub, the first sub comprises a transmission circuit, and the second sub comprises the reception circuit.

7. The method of claim 6, wherein a third sub is located between the first sub and the second sub.

8. The method of claim 1, wherein adjusting comprises synchronizing a clock.

9. The method of claim 1, further comprising filtering the third signal.

10. The method of claim 1, wherein the instrument is a voltmeter.

11. The method of claim 1, wherein the processor receives a value representative of a measured amplitude of the third signal from the instrument.

12. The method of claim 1, further comprising adjusting, by using the processor, a phase of the second signal based at least in part on the measured parameter of the third signal.

13. A reception circuit to measure a parameter of interest, the reception circuit comprising:
   an antenna to receive a first signal having a first frequency;
   a signal generator to generate a second signal having a second frequency;
   a multiplier to generate a third signal by mixing the first signal and the second signal;
   an instrument to measure a parameter of the third signal; and
   a processor to adjust the second signal generated by the signal generator based at least in part on the measured parameter of the third signal, wherein the adjusted second signal has a frequency substantially equal to the first frequency, the processor further determining the parameter of interest using the frequency of the adjusted second signal.

14. The reception circuit of claim 13, further comprising a bottom hole assembly conveyed into an earth formation, wherein the reception circuit is disposed in the bottom hole assembly.

15. The reception circuit of claim 14, wherein the bottom hole assembly comprises a resistivity tool and the first signal is an electromagnetic signal.

16. The reception circuit of claim 13, wherein the measured parameter is an amplitude of the third signal.

17. The reception circuit of claim 16, wherein adjusting comprises identifying a maximum of the amplitude of the third signal.

18. The reception circuit of claim 13, further comprising a filter to filter the third signal.

19. The reception circuit of claim 13, wherein the processor receives a value representative to the measured amplitude of the third signal from the instrument.

20. The reception circuit of claim 13, wherein the processor adjusts a phase of the second signal based at least in part on the measured parameter of the third signal.

* * * * *